(12) United States Patent
Tamberg (10) Patent No.: US 9,250,793 B2
(45) Date of Patent: Feb. 2, 2016

(54) INTERFACE MANAGEMENT SYSTEMS AND METHODS

(71) Applicant: Marcin Tamberg, Walldorf (DE)

(72) Inventor: Marcin Tamberg, Walldorf (DE)

(73) Assignee: SAP SE, Walldorf (DE)

( * ) Notice: Subject to any disclaimer, the term of this patent is extended or adjusted under 35 U.S.C. 154(b) by 111 days.

(21) Appl. No.: 13/723,554

(22) Filed: Dec. 21, 2012

(65) Prior Publication Data

US 2014/0181707 A1 Jun. 26, 2014

(51) Int. Cl.
*G06F 3/0481* (2013.01)
*G06F 3/0488* (2013.01)
*G06F 3/0486* (2013.01)
*G06F 9/44* (2006.01)
*G06F 9/445* (2006.01)

(52) U.S. Cl.
CPC ............ *G06F 3/0488* (2013.01); *G06F 3/0486* (2013.01); *G06F 3/04817* (2013.01); *G06F 9/4443* (2013.01); *G06F 9/4451* (2013.01)

(58) Field of Classification Search
CPC ............... G09G 2320/0261; G09G 2320/026; G06F 17/243; G06F 17/246; G06F 3/0486
USPC ......... 715/221–226, 243–253, 762–763, 780, 715/799; 345/619
See application file for complete search history.

(56) References Cited

U.S. PATENT DOCUMENTS

| | | | | |
|---|---|---|---|---|
| 5,333,252 A * | 7/1994 | Brewer et al. | ................ | 715/205 |
| 5,444,841 A * | 8/1995 | Glaser et al. | ................ | 715/224 |
| 7,313,757 B2 * | 12/2007 | Bradley et al. | ................ | 715/222 |
| 7,730,410 B2 * | 6/2010 | Goering | ................ | 715/741 |
| 8,171,399 B2 * | 5/2012 | Coppedge et al. | ............ | 715/243 |
| 2005/0102632 A1 * | 5/2005 | Klinger et al. | ................ | 715/789 |
| 2010/0088590 A1 * | 4/2010 | Bajohr et al. | ................ | 715/235 |
| 2012/0117121 A1 * | 5/2012 | Thomas et al. | ................ | 707/796 |
| 2013/0097480 A1 * | 4/2013 | Allison et al. | ................ | 715/223 |
| 2013/0328913 A1 * | 12/2013 | Nassar | .......................... | 345/619 |

* cited by examiner

*Primary Examiner* — Andrew Tank
(74) *Attorney, Agent, or Firm* — Schwegman Lundberg & Woessner, P.A.

(57) ABSTRACT

Example systems and methods of managing a user interface are described. In one implementation, a method displays a user interface for an application, the application has a plurality of fields is described. A user selection of a field of the plurality of fields is detected via a touch-sensitive screen. A user input indicating a new position of the selected field is received. The other fields affected by the new position are identified and repositioned based on the new position of the selected field. The plurality of fields has a set of data associated with them. A user activation of a field editing operation is detected. An editing command from the user is received via a touch-sensitive screen. The editing command is implemented with respect to at least one field, and the user interface is updated. The updated user interface is displayed with the set of data.

18 Claims, 9 Drawing Sheets

INTERFACE MANAGEMENT SYSTEMS AND METHODS

FIELD

The present disclosure relates generally to a user interface and, more specifically, to management of the user interface.

BACKGROUND

Computing systems and application programs display various types of content to users via a display device. The content may be displayed as a field with a set of data associated with it. In some situations, a user may want to personalize and configure how the content and fields are displayed. In this situation, it is desirable to provide an easy and intuitive approach to configuring content and fields for display.

BRIEF DESCRIPTION OF THE DRAWINGS

The present disclosure is illustrated by way of example, and not as limitation, in the accompanying figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide systems and methods for configuring a user interface on a display device. These embodiments discuss, by way of example, the management and configuration of a user interface far an application having multiple fields. Some embodiments describe rearranging fields in a user interface via a touch-sensitive screen and displaying data associated with the fields in the rearranged positions. Other embodiments describe editing the user interface via a touch-sensitive screen by adding or removing fields from the user interface. The ability to configure fields for an application via a touch-sensitive screen is user-intuitive and allows the user to personalize an application to display data to his or her preference.

Figure 1:
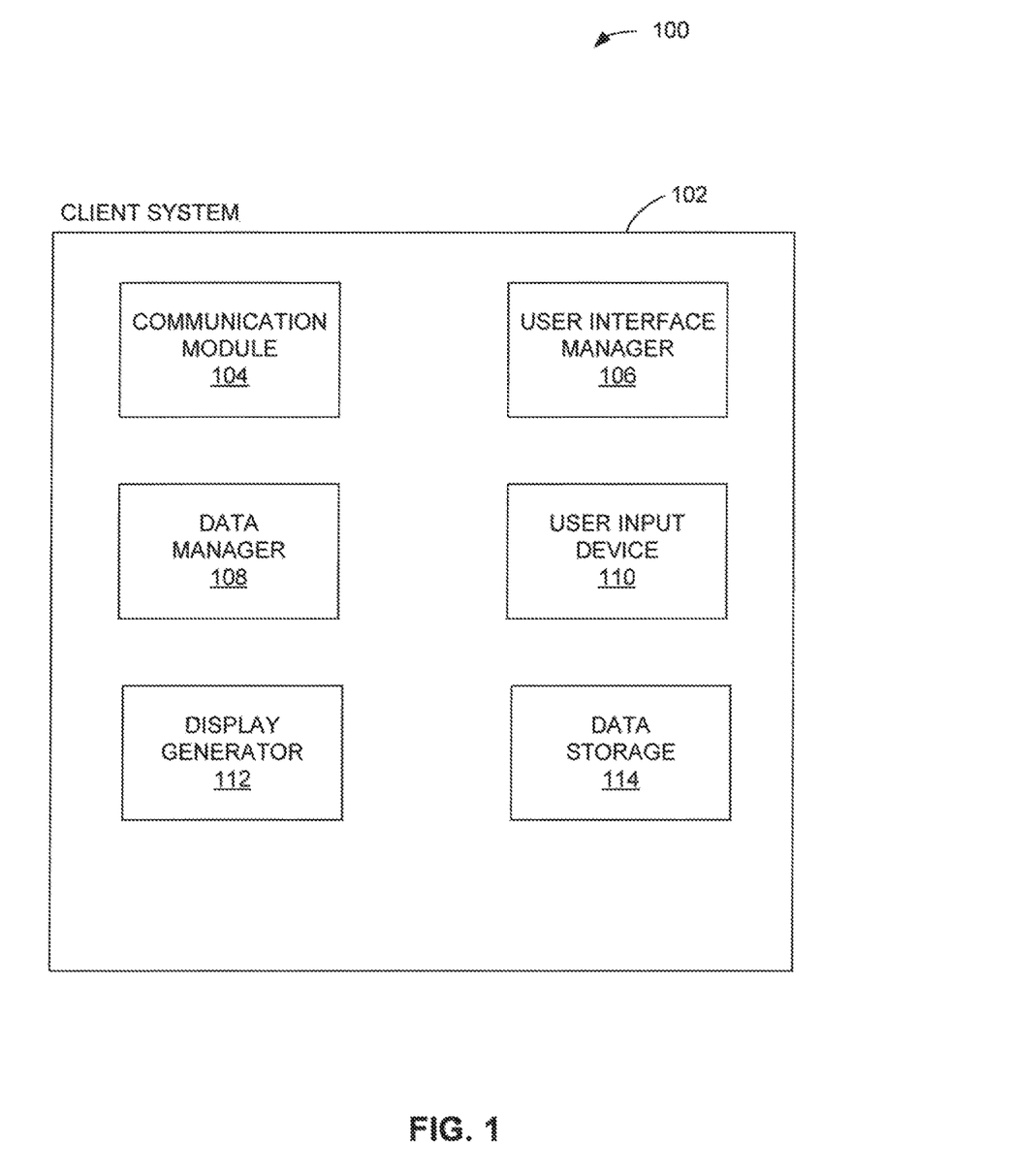
FIG. 1 is a block diagram of an example system capable of employing the systems and methods described herein.

FIG. 1 is a block diagram of an example system 100 capable of employing the systems and methods described herein. In the example system of FIG. 1, a client system 102 includes various modules such as a communication module 104, a user interface manager 106, a data manager 108, a user input device 110, a display generator 112, and a data storage 114.

The client system 102 includes any type of system capable of performing one or more functions described herein. For example, the client system 102 may include a client computer, a desktop computer, a laptop computer, a tablet computer, a mobile device, a portable entertainment device or any other machine capable of performing one or more of the functions and operations discussed herein. The client system 102 includes, for example, machines and software to implement the described interface management systems and methods.

In some embodiments, a server may perform some of the functions and operations described herein, while the client system 102 performs the other functions. In that case, the client system 102 communicates with the server via a data communication network, such as the Internet, a local area network (LAN), wide area network (WAN), and so forth. In particular implementations, the client system 102 may be accessed or operated by a variety of users, such as an application developer, a network administrator or an end-user of an application. In other implementations, one or more functions performed by the client system 102 may be handled automatically and without user intervention.

The client system 102 includes a communication module 104 capable of communicating with a variety of different systems through a data communication network or other communication mechanism. For example, the communication module 104 may communicate with a server, other client systems, content sources, data storage devices, and the like. A user interface manager 106 performs various functions related to managing, configuring, updating, and saving various user interfaces capable of being rendered on the client system 102. For example, the user interface manager 106 manages interaction between the user and the client system 102. This interaction may take place via a user input device 110. The user interface manager 106 also activates a personalization or configuration mode in which the user is to configure and personalize a user interface. Further, the user interface manager 106 updates the user interface based on the user's edits and configurations, and then saves the updated user interface as being associated with the user, a template, or a device. The user interface may be related to an application, and the application may have multiple fields that are configurable by a user.

The client system 102 further includes a data manager 108 and a user input device 110. The data manager 108 performs various functions related to accessing, organizing, presenting, and editing various types of data. For example, the data manager 108 identifies and stores a data set for presentation on a display device as discussed herein. Further, the data manager 108 modifies the data set based on, for example, user instructions and various menu-selected actions. As used herein, a "data set" includes any type of data, such as text data, numerical data, graphical data, documents, images, spreadsheets, application data, and the like. A data set may also include any grouping or collection of data, such as different types of data grouped together in a single data set. Additionally, the terms "data set" and "set of data" are used interchangeably herein.

The user input device 110 performs various functions related to receiving input from a user and displaying a user interface on the client system 102. The user input device 110 may include any device capable of receiving input and displaying interfaces on the client system 102. For example, the user input device 110 is a touch-sensitive screen capable of recognizing an input via a user's touch. The user may use his or her finger or use a touch screen stylus pen to provide input to the client system 102 via the user input device 110.

The client system 102 further includes a display generator 112 and data storage 114. The display generator 112 generates appropriate display information to support the display of a user interface, the fields of an application, a data set associated with the fields, and cut figuration commands. The data storage 114 manages and stores data associated with the fields and the application.

Figure 2A:
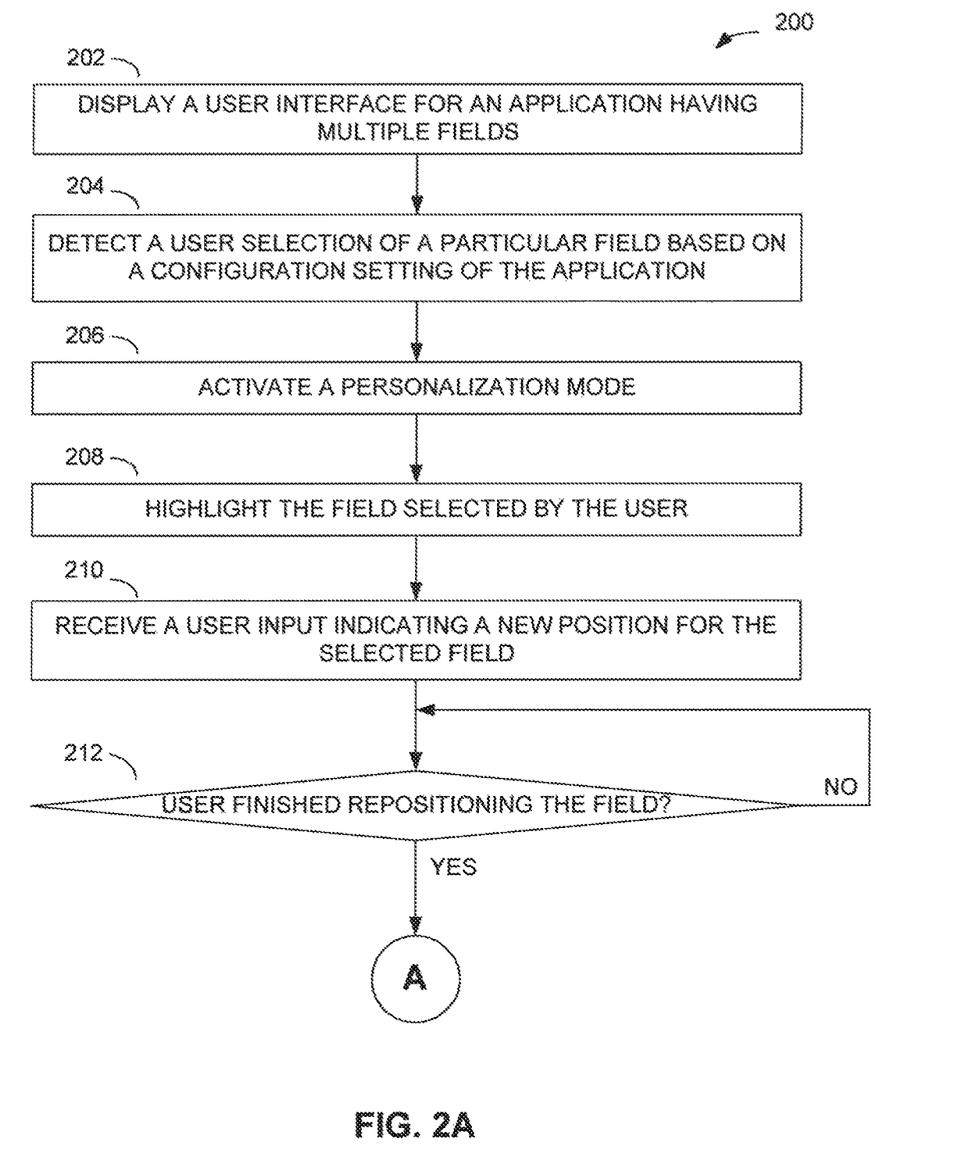
FIGS. 2A and 2B are flow diagrams of an example method of configuring a user interface of an application by rearranging fields.
Figure 2B:
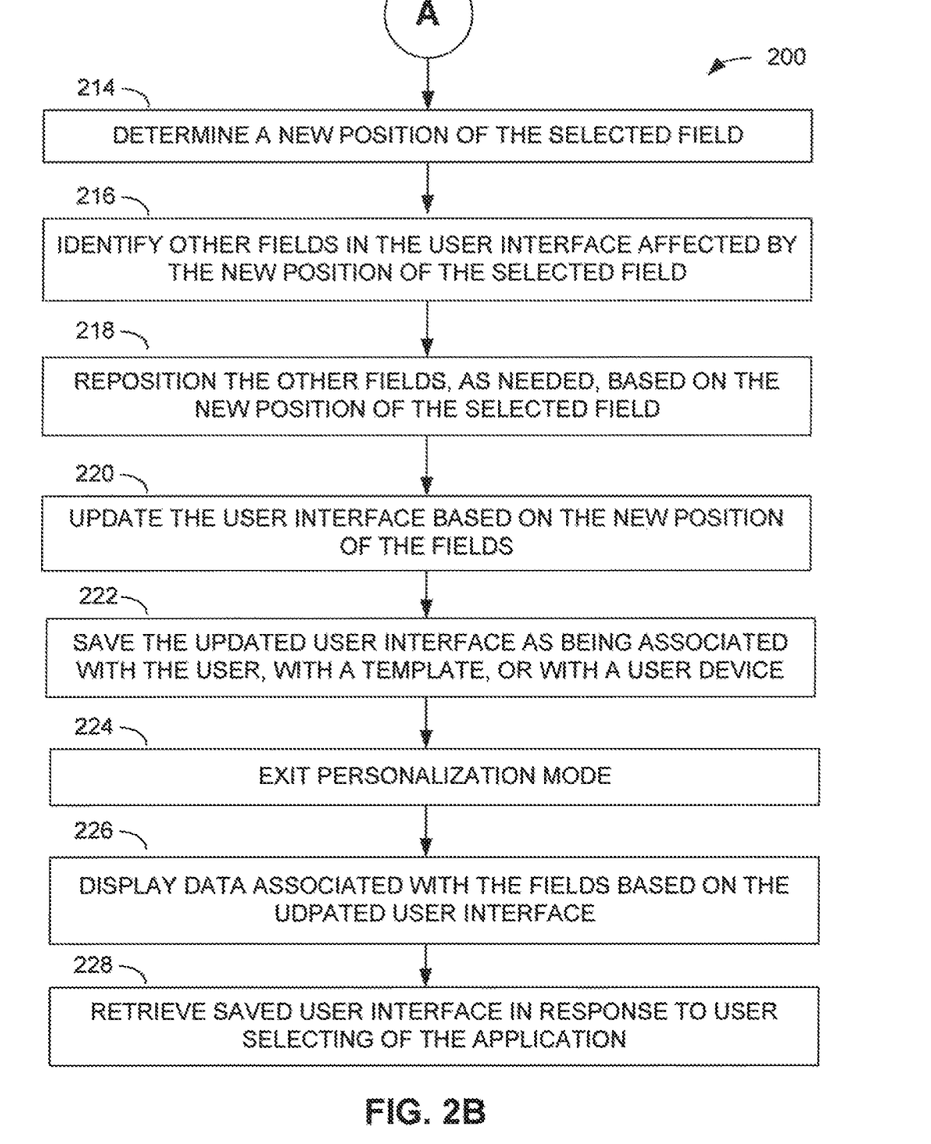
Figure 4:
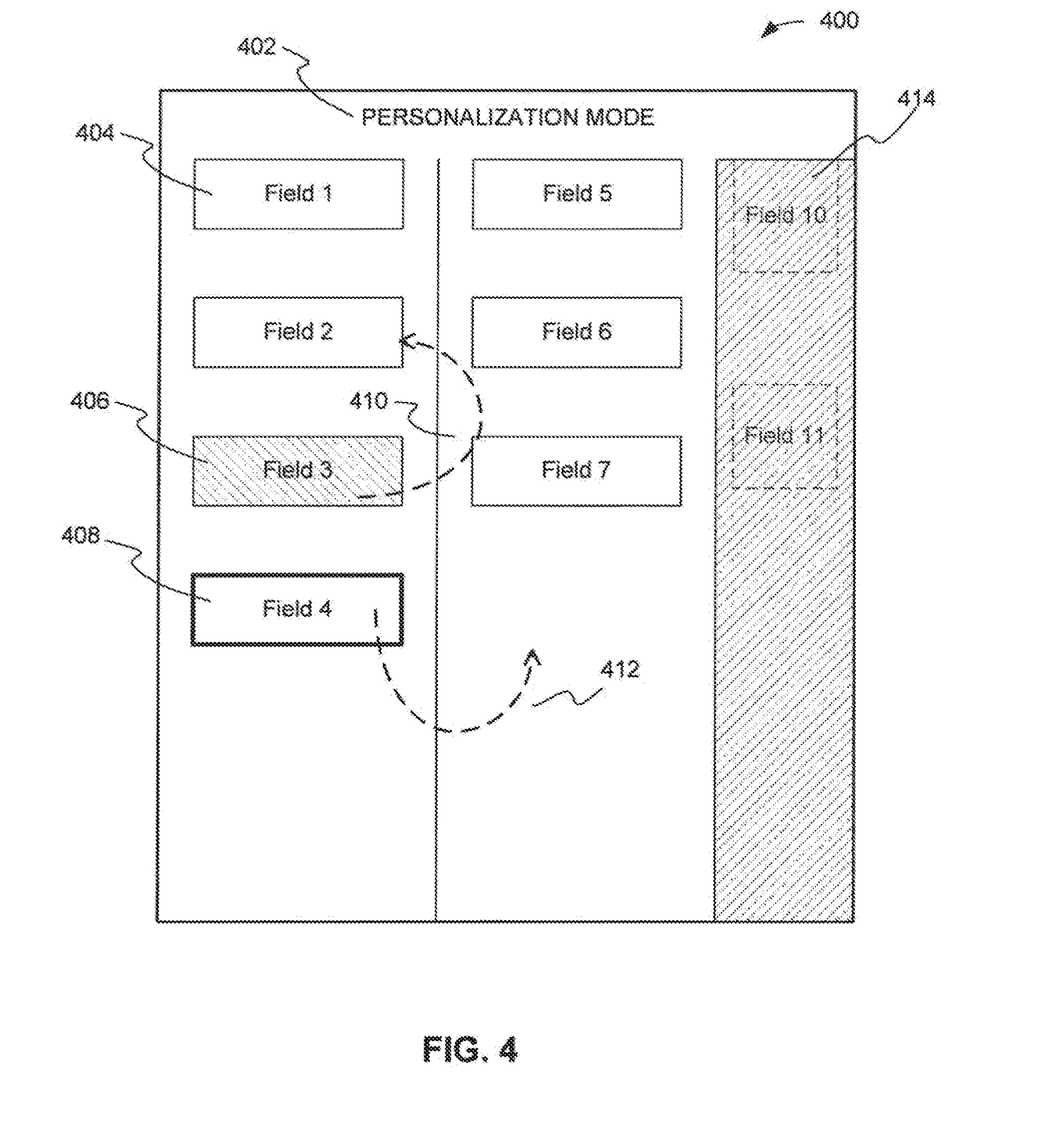
FIG. 4 illustrates an example user interface for configuring a user interface of an application.
Figure 6:
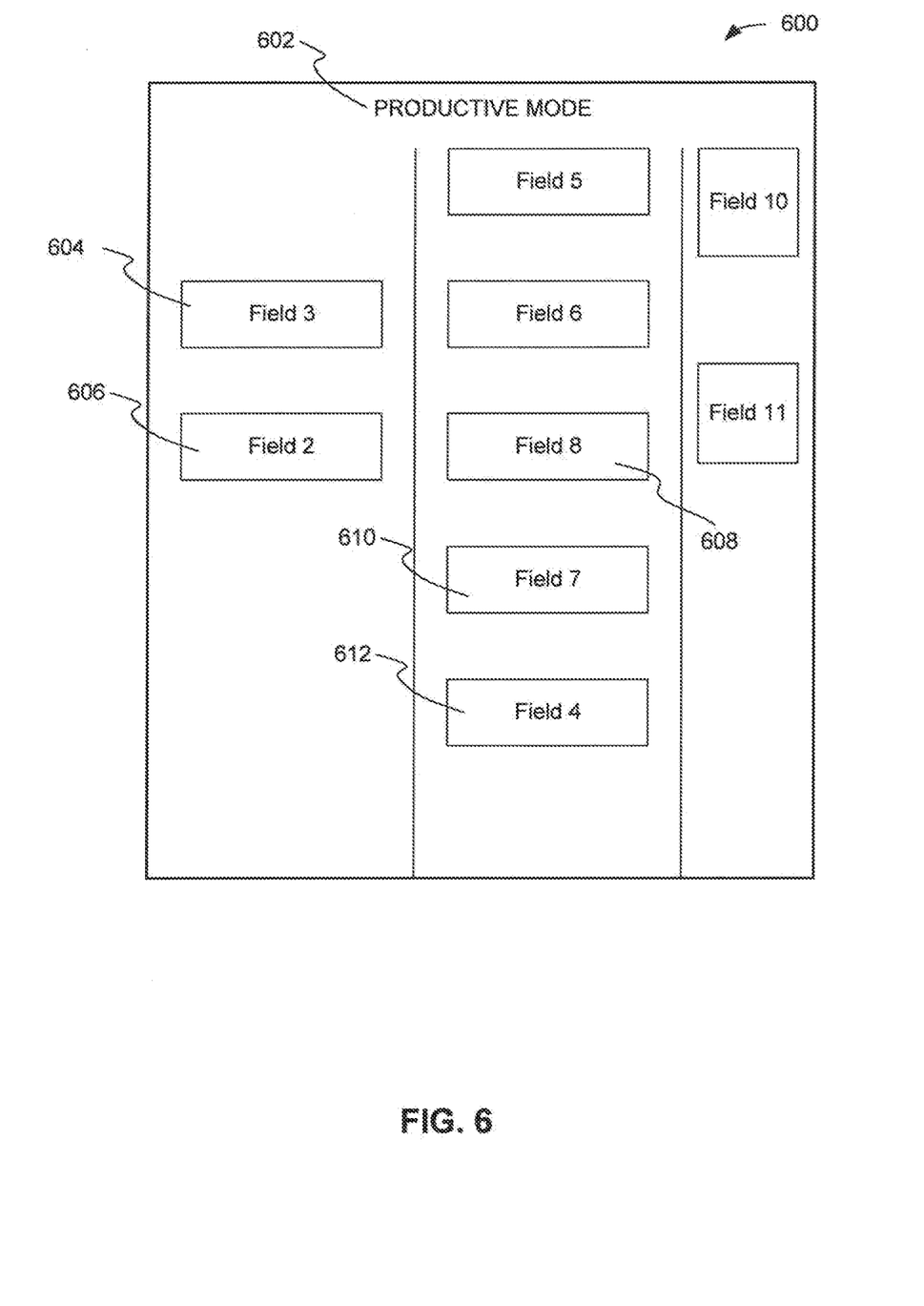
FIG. 6 illustrates another example user interface for configuring a user interface of an application.

FIGS. 2A and 2B illustrate a flow diagram of example methods for configuring a user interface of an application by rearranging the fields of the user interface. FIG. 4 illustrates an example user interface screen 400 according to some embodiments. FIG. 6 illustrates an example user interface screen 600 according to some embodiments. FIGS. 2A, 2B, 4, and 6 are described below in conjunction with each other to describe one or more embodiments of the interface management systems and methods.

FIG. 4 shows user interface screen 400. User interface screen 400 displays a mode 402 at the top of the screen, for example, here the mode is a personalization mode. Even though the mode 402 is displayed at the top of the screen, it is understood that the mode 402 may be displayed anywhere else on the screen. The user interface screen 400 includes multiple fields, such as, for example, field 404 labeled as Field 1, field 406 labeled as Field 3, and field 408 labeled as Field 4. The user interface screen 400 also includes an inactive portion 414.

FIG. 6 shows user interface screen 600. User interface screen 600 displays a mode 602 at the top of the screen. For example, here the mode is a productive mode. Even though the mode 602 is displayed, at the top of the screen, it is understood that the mode 602 may be displayed anywhere else on the screen. User interface screen 600 includes multiple fields, such as, for example, field 604 labeled as Field 3, field 606, labeled as Field 2, field 608 labeled as Field 8, field 610 labeled as Field 7, and field 612 labeled as Field 4.

FIG. 2A illustrates a flow diagram of an example method 200 for configuring a user interface of an application by rearranging the fields of the user interface. The method 200 starts off by displaying a user interface for an application that has multiple fields at a block 202. The application may be a mobile application that runs on a mobile device such as a smart phone, mobile phone, or a tablet. The application may be a mobile application provided by SAP AG of Walldorf, Germany that relates to business solutions such as managing processes, performing analytics, managing data, managing projects, and other solutions that SAP offers. The application has a plurality of fields. Each field has data associated with it. This data can include any type of data, such as text data, numerical data, graphical data, documents, images, spreadsheets, application data, and the like. The application also has a user interface associated with it, which is displayed on a client device. The user interface comprises of the plurality of fields associated with the application. The user interface may be displayed on a client device that has a touch-sensitive screen.

After displaying the user interface for the application, the method 200 detects a user selection of a particular field at a block 204. The user can select a field from the plurality of fields based on a configuration setting of the application. The user may select the field on the touch-sensitive screen by touching the field with their finger or by touching the field with a stylus pen. The method may detect the user selection of a field based on the length of time the user touches the field. For example, the user may have to touch the field for a few seconds (instead of tapping the field) to indicate that they want to select the field to personalize the user interface.

After detecting the selection of a field, the method 200 may activate a personalization mode at a block 206. In some embodiments, the user interface may display a 'personalization' button, which the user can touch/select to activate the personalization mode. In other embodiments, the personalization mode may be activated upon detection of the selection of a field. The user interface may indicate that the application is in the personalization mode by displaying the mode name as shown in FIG. 4 at mode 402. The application may have configuration settings that allow the user to select a certain set of fields of the application, while the other fields are inactive and not selectable by the user. The inactive fields may be 'grayed out' or 'shaded' to indicate to the user that they cannot select these fields as shown at inactive portion 414 of FIG. 4. Inactive portion 414 shows the portion of the screen comprising Field 10 and Field 11 as 'shaded.' This may indicate to the user that they cannot configure inactive portion 414. The configuration settings of the application may be set by the application developer or application provider, such as SAP, or they may be set by the user.

The method 200 may highlight the field selected by the user at a block 208. In some embodiments, the selected field may be highlighted after detecting the user selection of the field at block 204. In other embodiments, the selected field may be highlighted after activating the personalization mode at block 206. The selected field can be highlighted using various coloring or shading techniques. For example, the selected field may have a different color than the other fields, or the selected field may be shaded as shown by field 406 of FIG. 4. The selected field may have a thicker border to indicate that it is highlighted as shown by field 408 of FIG. 4. Even though FIG. 4 shows field 406 as shaded and field 408 with a thicker border, it is understood that only one of the techniques, either shading or thicker border, may be used to highlight a selected field.

At a block 210, the method 200 receives a user input indicating a new position for the selected field. The user input includes the user dragging the selected field from its original position to a new position within the user interface. The user may drag the selected field by using their finger or by using a stylus pen. The user can drag the selected field by touching the field, and moving the field while keeping their finger or stylus pen in contact with the touch-sensitive screen. The user can indicate the field's new position by releasing or dropping the field at a desired new position by lifting their finger or stylus pen from the touch-sensitive screen. The new position of the selected field can be a position that the user deems appropriate for his needs, so that the data associated with that field is easily accessible to the user. For example, as illustrated by arrow 410 of FIG. 4, the user may drag field 406 to the position of Field 2, indicating a new position of field 406 as the original position of Field 2. As illustrated by arrow 412, the user may drag field 408 to a new position.

In an example embodiment, the user interface of the application may display the fields in various columns and rows. The user can drag the selected field from one of these columns to another column or row. Similarly, the user can drag the selected field from one of these rows to another column or row. The user can also drag the selected field within the same column and/or row. In alternative embodiments, the user interface of the application may not display the fields in columns and rows. In other embodiments, the user interface of the application may display the fields as only columns or as only rows.

The user may not drag the selected field to the inactivate portion of the user interface. Such inactive portions may be grayed out to indicate to the user that he cannot move the selected field to the inactive portion. An example embodiment is shown by inactive portion 414 of FIG. 4. As discussed above, the configuration settings of the application may determine the portion of the application that is inactive. For example, an application may consist of two independent parts, and the configuration settings may indicate that the fields from one independent part may not be moved to the other independent part. If the user selects a field from the first independent part, then the second independent part becomes inactive because the selected field cannot be moved to this part of the application. Similarly, if the user selects a field in the second independent part, then the first independent part becomes inactive because the selected field cannot be moved to this part of the application. In another example, an application may consist of two independent parts, and the configuration settings for the application may indicate that the second independent part cannot be configured by the user. In this case, when the user selects a field from the second independent part, that is not configurable by the user, the personalization mode is not activated, thus not allowing the user to move the fields of the second independent part.

In some embodiments, if the user drags the selected field to an inactive portion, then the selected field may by grayed out or shaded to indicate that the selected field cannot be moved to the inactive portion. If the user drops the selected field in the inactive portion attempting to move it there, then the selected field may return back to its original position within the user interface. In other embodiments, if the user attempts to move the selected field to the inactive portion, then the user interface may display a warning or a notice. The warning or notice may indicate via text and/or icons to the user that the selected field cannot be moved to that portion.

At a block 212, the method 200 checks whether the user is finished repositioning the selected field. If the user is not done repositioning, then the method continues to receive user input. If the user is done repositioning the selected field, then the method 200 proceeds to a block 216 shown in FIG. 2B.

FIG. 2B is a flow diagram of an example method 200 for configuring a user interface of an application by rearranging the fields of the user interface. The method 200 determines the new position of the selected field at a block 214. For example, as illustrated by arrow 410, a user may drag and drop field 406 at the new position. In this case, it is determined at block 214 that the new position is the original position of Field 2 because the user dropped/released the field at that position. As discussed above, the user can drag a field by touching the field, and moving the field while keeping their finger or stylus pen in contact with the touch-sensitive screen. The user can drop or release a field by lifting his finger or stylus pen off the touch screen.

After determining the new position of the selected field, the method 200 identifies the fields in the user interface that are affected by the new position of the selected field at a block 206. One or more of the fields in the user interface may be affected by the new position of the selected field. For example, the new position may be the original position of another field or the new position may be between two fields. In this case, the fields may need to be moved or repositioned to make space for the selected field. In another example, the new position of the selected field may be towards the end of the user interface. In this case, the other fields may be moved to fill up the empty space left by the selected field. FIG. 4 shows an example where field 406 is moved by the user according to arrow 410. The new position of field 406 is the original position of Field 2. In this example, block 216 identifies Field 2 as being affected by the new position of field 406.

At a block 218 the method 200 repositions the other fields based on the new position of the selected fields. The other fields are repositioned as needed. For example, the other fields may be moved within the user interface to make space for the selected field. FIG. 4 shows an example where the user selects field 406, labeled as Field 3, and moves it according to arrow 410, indicating a new position for field 406. FIG. 6 shows the end result of this operation. Field 604, labeled as Field 3, is displayed above field 606, labeled as Field 2. Field 606 was repositioned to make space for field 604 based on the rearranging operation illustrated by arrow 410 in FIG. 4. In this example, field 606 was repositioned below field 604, but it is understood that field 606 may be moved anywhere else in the user interface. For example, field 606 may be repositioned above field 604 or next to field 604. FIG. 4 shows another example where the user selects field 408, labeled as Field 4, and moves it according to arrow 412, indicating a new position for field 412. FIG. 6 shows the end result where field 612, labeled as Field 4, is repositioned at the new position towards the end of the user interface. In this example, other fields were not moved to fill up the empty space left by field 612. In other examples, other fields may be moved to fill up the empty space.

The method 200 updates the user interface, at a block 220, based on the new position of the selected fields and the repositioning of the other fields. The updating of the user interface includes displaying the fields in the personalization mode based on the updated positions. For example, block 220 may update the user interface according to FIG. 6 when the user performs the actions illustrated in FIG. 4.

The updated user interface may be saved at a block 222. The user interface may be saved as associated with the user that is currently using the application. The application may determine the user by checking the username or log-in information associated with the application. The user interface may also be saved as associated with a template. The user may have the option to save the updated user interface as a template of their choice. For example, the user may work with a business solution application, and may use the application to maintain customer information and to maintain order information. In this case, the user would like access to different information depending on the task they are performing. The user can configure a user interface so that they have easy access to customer information, and save this updated user interface as a template for customer information, and can configure another user interface so they have easy access to order information and save this updated user interface as a template for order information. Depending on which information the user wants to work with, they can select from the various saved templates and access the updated user interface. Thus, the user does not have to reconfigure the fields.

The user interface may also be saved as being associated with a device. For example, the user may save the user interface as one that is associated with their mobile phone versus a tablet device. The screens for a mobile phone and a tablet device may have different dimensions; therefore, the user may want to configure the fields so that information is displayed to fit the different screen dimensions. Depending on which device the user is working on, the updated user interface for that device may be automatically displayed. In other embodiments, the user may select the updated user interface for that device.

The method 200 exits the personalization mode at block 224. Upon exiting the personalization mode, the user interface may be in productive mode as shown by mode 602 in FIG. 6. The personalization mode is a mode where the user can configure and personalize the user interface. The productive mode is a mode where the user can use the user interface and the application. In some embodiments, the method 200 may save the updated user interface at block 222 after exiting the personalization mode at block 224.

At a block 226, the method 200 displays data associated with the fields based on the updated user interface. Each of the plurality of fields has data associated with it. The data associated with the field is displayed in the new position of the field. When the user moves the selected field, the database associated with the data for the field is not affected. The data is not copied or moved to another database or data source. Only the display of the field and the display of the data are affected. When the data associated with the field is updated by the user or the application, the updated data is displayed in the user interface at the new position of the field.

When the user accesses the application again, at a later time, the method 200 retrieves the saved user interface at a block 228. For example, the user may personalize the user interface of the application on a mobile device, and then exit the application. The user then may access the application at a later time. The method 200 retrieves the saved user interface and displays that on the mobile device. The method may retrieve the saved user interface based on the user, a template or a device. For example, the user interface saved as being associated with the user may be retrieved based on the username used to log in to the application. If the user accesses the application on his mobile phone then the user interface associated with the mobile phone may be retrieved. If the user accesses the application on a tablet then the user interface associated with the tablet may be retrieved. If the user accesses the application and specifies a template, then the user interface associated with the template is retrieved.

Figure 3A:
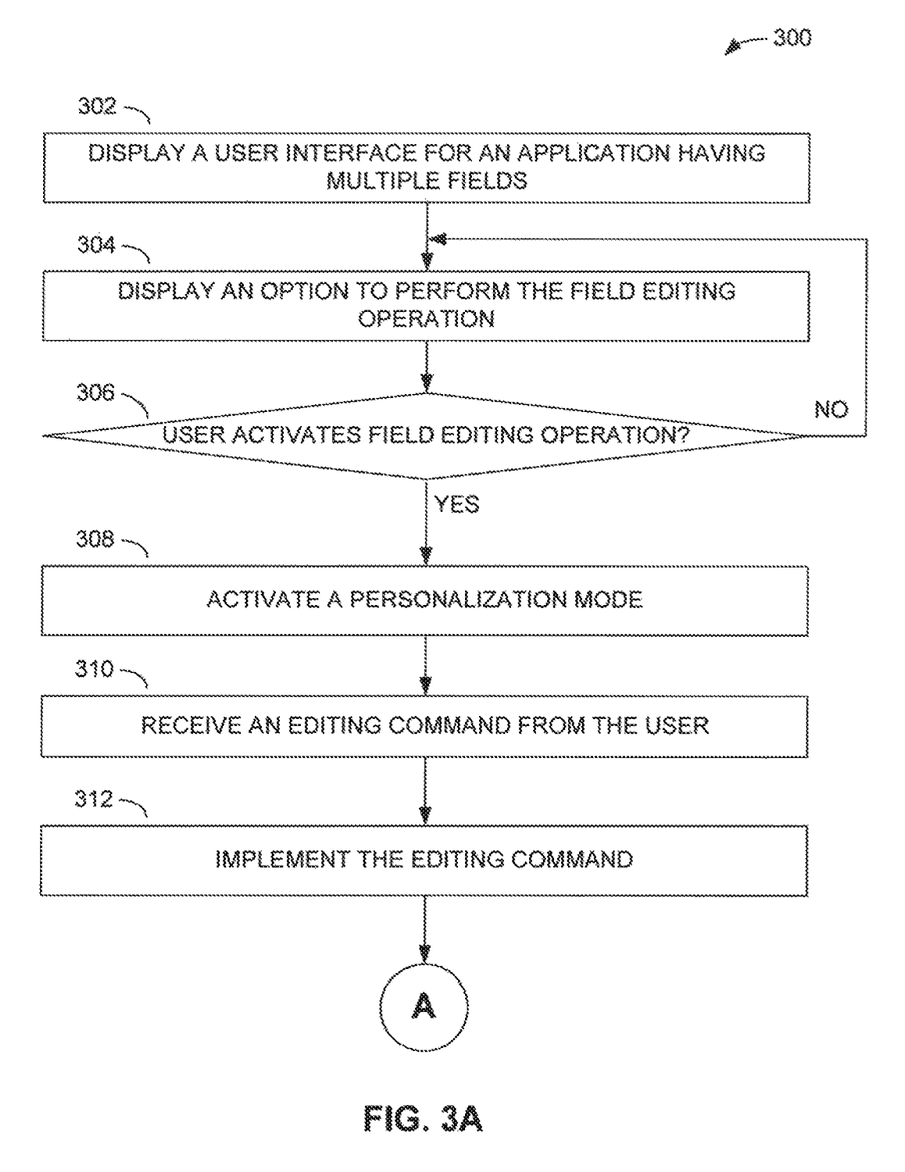
FIGS. 3A and 3B are flow diagrams of an example method of configuring a user interface of an application by adding or removing fields.
Figure 3B:
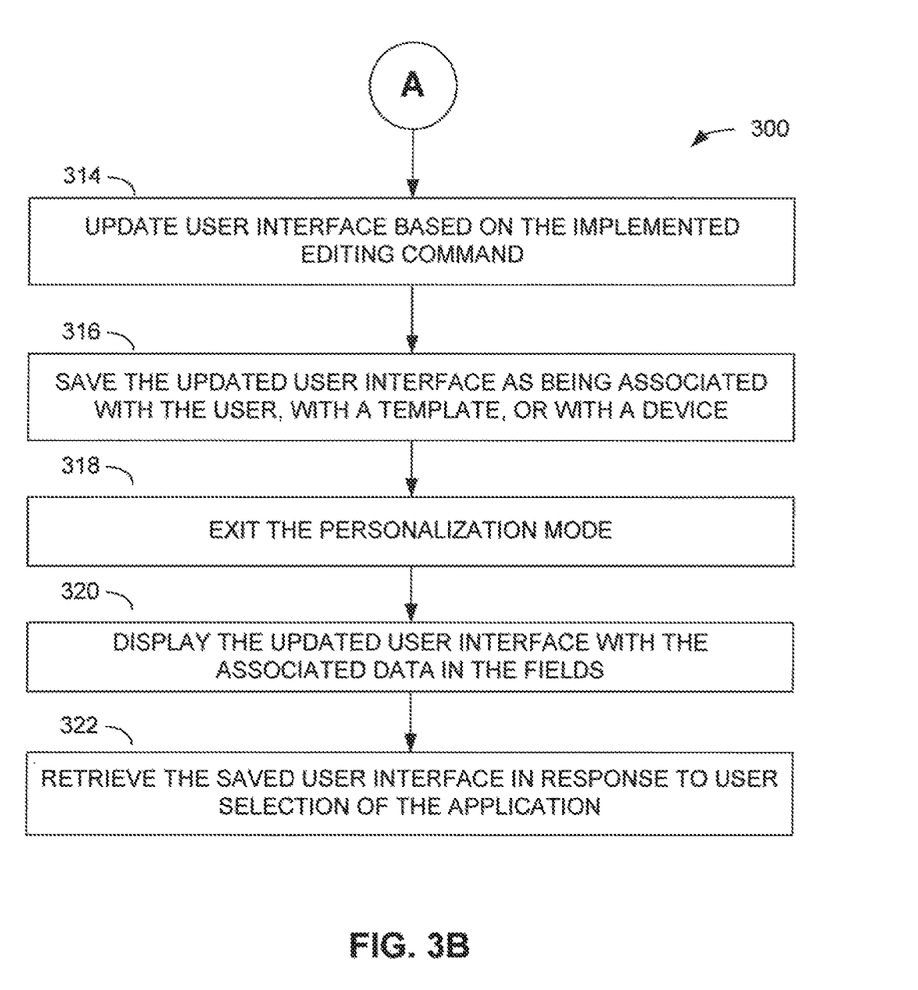
Figure 5:
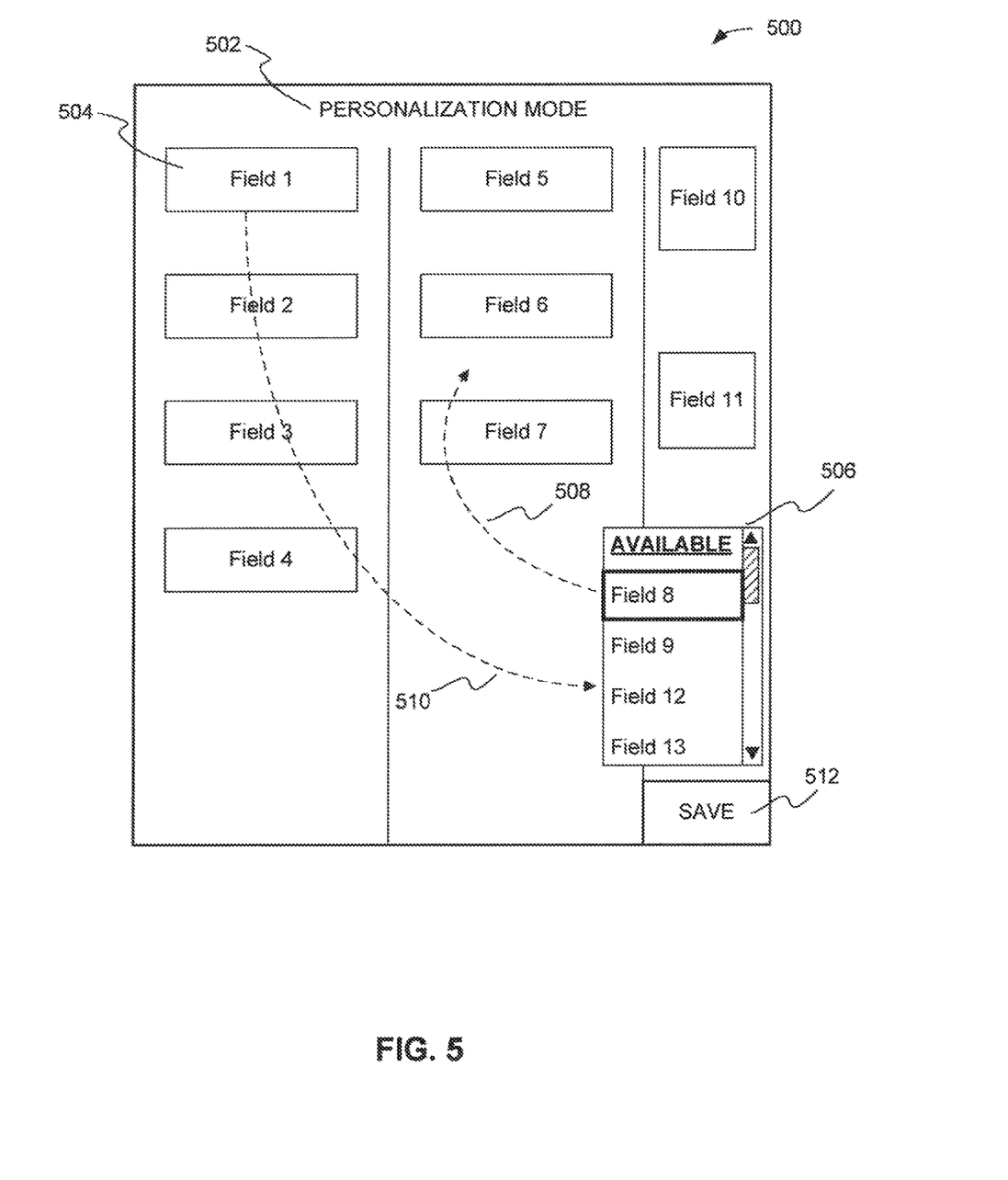
FIG. 5 illustrates another example user interface for configuring a user interface of an application.

FIGS. 3A and 3B illustrate a flow diagram of example methods for configuring a user interface of an application by adding and/or removing fields. FIGS. 5 and 6 illustrate example user interface screens according to some embodiments. FIGS. 3A, 3B, 5, and 6 are described below in conjunction with each other to describe one or more embodiments of the interface management systems and methods.

FIG. 5 illustrates user interface screen 500 including a mode 502 at the top of the screen. For example, here the mode is the personalization mode. Even though mode 502 is displayed at the top of the screen, it is understood that the mode 402 may be displayed anywhere else on the screen. User interface screen 500 also includes multiple fields, such as, for example, field 504 labeled as Field 1. User interface screen 500 also includes a list 506 illustrating an available fields list, and a save button 512.

FIG. 3A is a flow diagram of an example method 300 for configuring a user interface of an application by adding and/or removing fields. The method 300 starts off at a block 302 by displaying a user interface for an application, where the application has multiple fields. As discussed above, the application may be a mobile application that runs on a mobile device such as a smart phone, mobile phone, or a tablet. The application may be a mobile application provided by SAP that relates to business solutions such as managing processes, performing analytics, managing data, managing projects, and other solutions that SAP offers. The application has a plurality of fields. Each field has data associated with it. This data can include any type of data, such as text data, numerical data, graphical data, documents, images, spreadsheets, application data, and the like. The application also has a user interface associated with it, which is displayed on a client device. The user interface comprises of the plurality of fields associated with the application. The user interface may be displayed on a client device that has a touch-sensitive screen.

The method 300 then displays an option to perform the field editing operation, at a block 304. The option to perform a field editing operation includes the option of adding a field and removing a field. The options may be displayed by displaying a list of available fields. For example, list 508 in FIG. 5 is labeled 'available' and shows multiple fields that are available to the user. The user can add a field from the available fields by selecting a field from the list. List 508 also includes a scroll bar which the user can scroll to display more available fields. The user can drag a field from the list, and drop the field at a desired position in the user interface. The user can remove a particular field by dragging the field and dropping it in the available fields list. Upon removing, the particular field appears in the available fields list, and is available for the user to add to the user interface. In some embodiments, the option to perform the field editing operation may be displayed as an icon or button. Upon selecting the icon or button, the available fields list may be displayed.

After displaying the option to perform a field editing operation, the method 300 determines whether the user activates a field editing operation, at a block 306. The user can activate the field editing operation by selecting a field to add from the available fields list. The user can also activate the field editing operation by selecting a field to remove from the user interface. Selecting a field includes the user touching the field on the touch-sensitive screen with his finger or with a stylus pen. In some embodiments, the user may activate a field editing operation by selecting an icon or button. The user may select the icon or button by touching it using their finger or a stylus pen. Activating the field editing operation allows the user to edit the fields of the user interface. The user is able to add a field to the user interface or remove a field from the user interface. If the user activates the field editing operation then the method 300 continues on to a block 308. If the user does not activate a field editing operation, then the method may continue to display the option to perform a field editing operation at block 304.

After the user activates the field editing operation, the method 300 may activate a personalization mode at a block 308. In some embodiments, the user interface may display a 'personalization' button, which the user can touch/select to activate the personalization mode. The user interface may indicate that the application is in the personalization mode by displaying the mode name on the screen as illustrated by mode 502 in FIG. 5. The personalization mode allows the user to personalize and configure the user interface as desired.

At a block 310, the method 300 receives an editing command from the user. The editing command may include adding a field to the user interface or removing a field from the user interface. The user can add a field to the user interface by selecting a field from the available fields list. The user may add a field from the available fields list by dragging a field from the list and dropping it at a desired position in the user interface. For example, the user may drag Field 8 from list 506 according to arrow 508 in FIG. 5. In this case, the new position of Field 8 is above Field 7. The user can remove or delete a field from the user interface by selecting the field from the user interface, and dragging it and dropping it in the available fields list. For example, the user may drag field 504 from the user interface to the list 506 according to arrow 510 in FIG. 5. The user performs the drag and drop actions using his finger or using a stylus pen. In other embodiments, the user interface may display a 'trash' icon, and the user may drag the field and drop it in the 'trash' to remove the field from the user interface.

After receiving an editing command from the user, the method 300 implements the editing command at a block 312. If the editing command is an add command, then the particular field selected by the user from the available fields list is added to the user interface at the position indicated by the user. The added field may not appear in the available fields list anymore. If the editing command is a remove command, then the field selected by the user from the user interface is removed from the user interface. The removed field may appear in the available fields list, and does not appear in the user interface anymore.

FIG. 3B is a flow diagram of an example method 300 for configuring a user interface of an application by rearranging the fields of the user interface. The method 300 continues at a block 314 and updates the user interface based on the implemented editing command. For an add command, the user interface is updated by repositioning the other fields based on the added field's position, so that the added field can be added to the user interface at the desired position. For example, as shown in FIG. 5, the user adds Field 8 from list 506 by dragging and dropping Field 8 according to arrow 508 above Field 7. FIG. 6 illustrates the updated user interface. Field 608, labeled as Field 8, is added to the user interface above field 610, labeled as Field 7. In this example, field 610 is repositioned to make space for field 608. Even though field 610 was repositioned below field 608, it is understood that field 610 may be repositioned anywhere else in the user interface.

In some embodiments, for a remove command, the user interface may be updated by repositioning the other fields based on the removed field position to maximize space in the user interface. In other embodiments, for a remove command, the other fields may not be repositioned and are displayed at their respective original positions. For example, as shown in FIG. 5, the user removes field 504, labeled as Field 1 by dragging field 504 from the user interface and dropping it in list 506 according to arrow 510. FIG. 6 illustrates the updated user interface. In this example, Field 1 is removed from the user interface, and the other fields are not repositioned to fill in the void created by removing Field 1. In another example, field 604 and field 606 may be repositioned to fill the void created by removing Field 1. In another example, Field 5 may be repositioned to fill the void created by removing Field 1. The functionalities of block 314 may be performed at the same time as the functionalities of block 312.

After updating the user interface, the method 300 saves the updated user interface at a block 316. A save button may be displayed as shown by button 512 in FIG. 5. The user can select the save button to save the updated user interface. The user interface may be saved as associated with the user that is currently using the application. The application may determine the user by checking the username or log-in information associated with the application. The user interface may also be saved as associated with a template. The user may the option to save the updated user interface as a template of their choice. For example, the user may work with a business solution application, and may use the application to maintain customer information and to maintain order information. In this case, the user would like access to different information depending on the task they are performing. The user can configure a user interface to have easy access to customer information, and save this updated user interface as a template for customer information, and can configure another user interface to have easy access to order information and save this updated user interface as a template for order information. Depending on which information the user wants to work with, they can select from the various templates he saved and access the updated user interface. Thus, the user does not have to re-configure the fields.

The user interface may also be saved as being associated with a device. For example, the user may save the user interface as one that is associated with a mobile phone versus a tablet device. The screens for a mobile phone and a tablet device may have different dimensions; therefore, the user may want to configure the fields so that information is displayed to fit the different screen dimensions. Depending on which device the user is working on, the updated user interface for that device may be automatically displayed. In other embodiments, the user may select the updated user interface for that device.

The method 300 exits the personalization mode at block 318. Upon exiting the personalization mode, the user interface may be in productive mode as shown by mode 602 in FIG. 6. The personalization mode is a mode where the user can configure and personalize the user interface. The productive mode is a mode where the user can use the user interface and the application. The method 300 may save the updated user interface at block 316 after exiting the personalization mode at block 318.

At a block 320, the method 300 displays data associated with the fields based on the updated user interface. Each of the plurality of fields has data associated with it. The data associated with the field is displayed in the new position of the field. When the user moves the selected field, the database associated with the data for the field is not affected. The data is not copied or moved to another database or data source. Only the display of the field and the display of the data are affected. When the data, associated with the field is updated by the user or the application, the updated data is displayed in the user interface at the new position of the field.

When the user accesses the application again, at a later time, the method 300 retrieves the saved user interface at a block 322. For example, the user may personalize the user interface of the application on a mobile device, and then exit the application. The user then may recess the application at a later time. The method 200 retrieves the saved user interface and displays that on the mobile device. The method may retrieve the saved user interface based on the user, a template or a device. For example, the user interface saved as being associated with the user may be retrieved based on the username used to log in to the application. If the user accesses the application on a mobile phone then the user interface associated with the mobile phone may be retrieved. If the user accesses the application on a tablet then the user interface associated with the tablet may be retrieved. If the user accesses the application and specifies a template, then the user interface associated with the template is retrieved.

In this manner, a mechanism, to configure user interfaces on a touch-sensitive screen for an application having multiple fields is provided. One or more processors, cause display of a user interface for an application, where the application has a plurality of fields. A user selection of a field of the plurality of fields is detected, via a touch-sensitive device. The user selection of the field may be based on a configuration setting of the application. A personalization mode may be activated in response to the detection of the user selection of the field. The selected field may be highlighted. A user input indicating a new position of the selected field in the user interface is received, and other fields in the user interface affected by the new position of the selected field are identified. The other fields are repositioned based on the new position of the selected field. The user interface may be updated based on the repositioning of the other fields. The updated user interface may be saved as being associated with the user, a template, or a user device. The saved user interface may be retrieved in response to the user selecting the application. The data associated with the plurality of fields may be displayed based on the repositioned fields.

A user activation of a field editing operation associated with at least one of the plurality of fields is detected. The plurality of fields has a set of data associated with them. A personalization mode may be activated in response to the detection of the user activation of the field editing operation. An editing command from the user via a touch-sensitive screen is received. The editing command may include an add command or a delete command. The user activation of the field editing operation may be based on a configuration setting of the application. The editing command is implemented with respect to the at least one field, and the user interface is updated in response to the implementation of the editing command. The updated user interface is displayed with the set of data associated with the plurality of fields. The updated user interface may be saved as being associated with the user, a template, or a user device. The saved user interface may be retrieved in response to the user selecting the application.

The mechanism described herein provides a user-intuitive way of personalizing the display of data of an application by allowing the user to configure application fields via a touch-sensitive screen. The user can configure fields in the user interface to have easy access to data that is important or desirable to the user. The user can also save the configured user interface so that the configured user interface is displayed when they access the application again. The user can save multiple configured user interfaces with different names, devices, or templates, so that the user can easily use the various configured user interfaces as needed.

Figure 7:
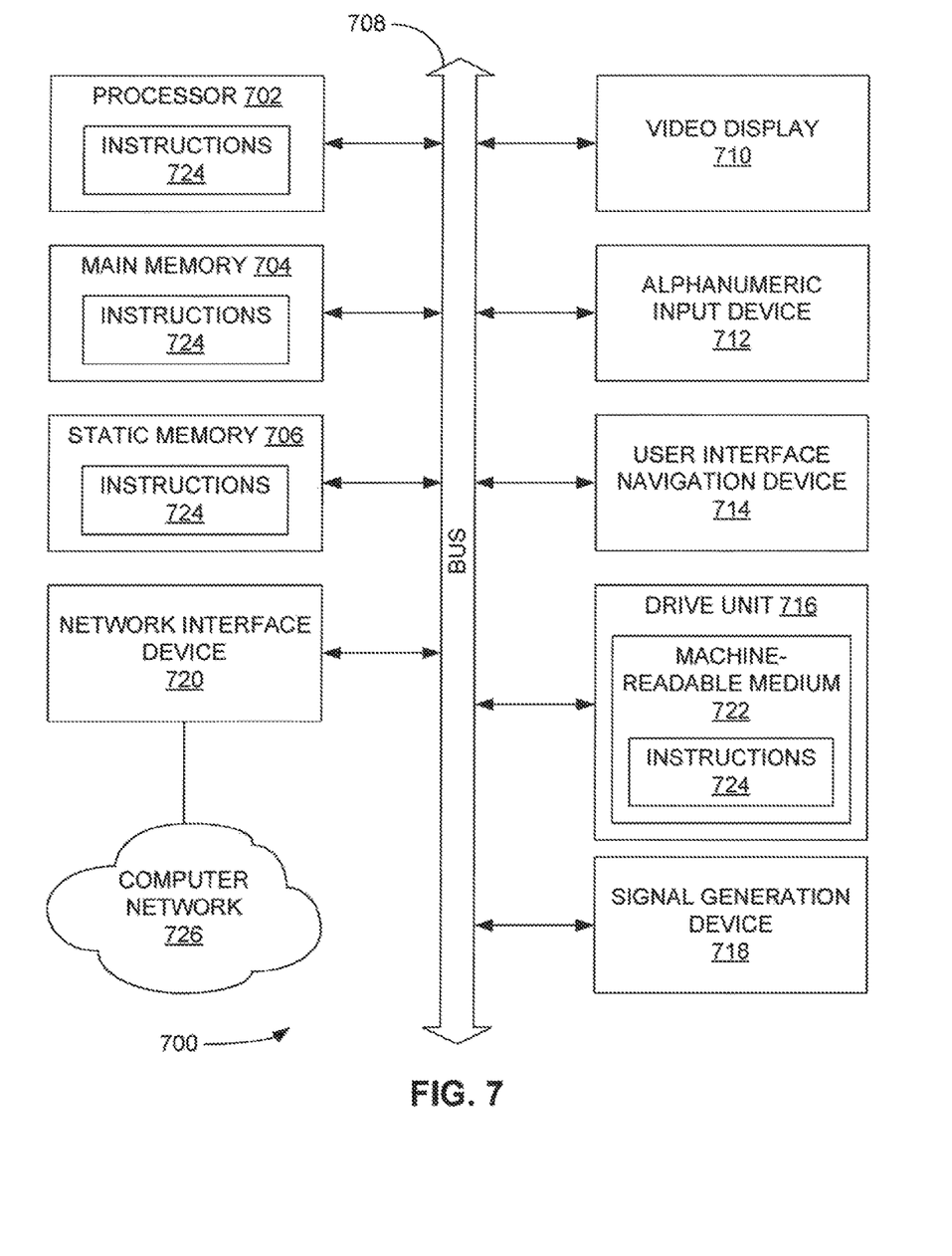
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (for example, a central processing unit (CPU), a graphics processing unit (GPU), or both), a main memory 704 (for example, random access memory), and static memory 706 (for example, static random-access memory), which communicate with each other via bus 708. The processing system 700 may further include video display unit 710 (for example, a plasma display, a liquid crystal display (LCD), or a cathode ray tube (CRT)). The processing system 700 also includes an alphanumeric input device 712 (for example, a keyboard), a user interface (UI) navigation device 714 (for example, a mouse), a disk drive unit 716, a signal generation device 718 (for example, a speaker), and a network interface device 720.

The disk drive unit 716 (a type of non-volatile memory storage) includes a machine-readable medium 722 on which is stored one or more sets of data structures and instructions 724 (for example, software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 726 via network interface device 720 utilizing any one of a number of well-known transfer protocols (for example, Hypertext Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 700) or one or more hardware modules of a computer system (for example, a processor 702 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)), to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (for example, by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (for example, within a home environment, within an office environment, or as a server farm), while in other embodiments, the processors 702 may be distributed across a number of locations.

While the embodiments are described with reference to various implementations and exploitations. It is understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A computer-implemented method comprising:

causing display, using one or more processors, of a first user interface having a plurality of fields for an application in a productive mode;

detecting a user selection of a field from the first user interface via a touch-sensitive screen;

activating, in response to detecting the user selected field from the first user interface, a second user interface for the application in a personalization mode to enable a user to modify at least one of the plurality of fields displayed in the first user interface, the second user interface comprising a selected field corresponding to the user selected field from the first user interface, a first set of fields, and a second set of fields, the first set of fields independently configurable to be associated with an active portion of the second user interface and the second set of fields independently configurable to be associated with an inactive portion of the second user interface;

causing display, using one or more processors, of the second user interface indicating that the selected field from the second user interface is associated the active portion of the second user interface or the inactive portion of the second user interface;

receiving a user input, via the touch-sensitive screen, indicating a new position of the selected field within the active portion of the second user interface if the selected field from the second user interface is associated with the active portion of the second user interface;

identifying other fields in the active portion of the second user interface affected by the new position of the selected; and repositioning the other fields within the active portion of the second user interface based on the new position of the selected field; and causing display, using one or more processors, of an updated first user interface for the application in the productive mode, the updated first user interface includes modifications to the at least one of the plurality of fields in the first user interface made to the second user interface during the personalization mode.

2. The computer-implemented method of claim 1, further comprising highlighting the user selected field detected in the first user.

3. The computer-implemented method of claim 1, further comprising saving the updated first user interface as being associated with the user.

4. The computer-implemented method of claim 3, further comprising retrieving the updated first user interface in response to the user selecting the application.

5. The computer-implemented method of claim 3, wherein the updated first user interface is saved as being associated with a template.

6. The computer-implemented method of claim 3, wherein the updated first user interface is saved as being associated with a user device.

7. The computer-implemented method of claim 1, further comprising allowing user selection of the field based on a configuration setting of the application.

8. The computer-implemented method of claim 1, wherein the second user interface duplicates the same fields and position of the fields shown in the first user interface.

9. A computer-implemented method comprising:

causing display, using one or more processors, of a first user interface having a plurality of fields for an application in a productive mode, the first user interface including an option to perform a field editing operation;

detecting a user activation of the option to perform the field editing operation via a touch-sensitive screen in the first user interface;

activating, in response to the user activation of the option to perform the field editing operation in the first user interface, a second user interface having the plurality of fields for the application in a personalization mode, the field editing operation enabling the user to modify the plurality of fields shown in the first user interface by editing commands to move, add, delete or reposition at least one field in the second user interface via a touch-sensitive screen;

causing display, using one or more processors, of the second user interface with a display overlay associated with the field editing operation, the display overlay displaying at least a portion of a list of available fields to add to the second user interface;

activating the field editing operation by receiving at least one editing command from the user via the touch-sensitive screen;

implementing the at least one editing command in the second user interface to modify the at least one field in the second user interface;

updating the first user interface to reflect the modifications made to the at least one field made in the second user interface; and causing display, using one or more processors, of the updated first user interface.

10. The computer-implemented method of claim 9, further comprising saving the updated first user interface as being associated with the user; and further comprising retrieving the updated first user interface in response to the user selecting the application.

11. The computer-implemented method of claim 9, further comprising allowing the user activation of the field editing operation based on a configuration setting of the application.

12. The computer-implemented method of claim 9, wherein the display option overlay includes a scroll bar to view additional fields in the list of available fields.

13. The computer-implemented method of claim 9, wherein the editing command performed by the user includes dragging a field from the list of available fields in the display overlay and dropping the field at a desired position on the second user interface.

14. The computer-implemented method of claim 13, further comprising updating the display overlay to remove the dropped field to the list of available fields.

15. The computer-implemented method of claim 9, wherein the editing command performed by the user includes dragging a field from the second user interface and dropping the field in the list of available fields within the display overlay.

16. The computer-implemented method of claim 15, further comprising updating the display overlay to add the dropped field from the list of available fields.

17. An apparatus comprising:
a touch-sensitive screen configured to interact with a user of the apparatus;
a memory configured to store data; and
one or more processors coupled to the memory, the one or more processors configured to:
cause display, using one or more processors, of a first user interface having a plurality of fields for an application in a productive mode, the productive mode enabling a user to use the application;
detect a user selection entered via the touch-sensitive screen, the user selection representing at least one of a field from the first user interface and an option to perform a field editing operation;
activate, in response to detecting the user selection in the first user interface, a second user interface for the application in a personalization mode, the personalization mode enabling the user to modify the plurality of fields shown in the first user interface by editing commands to move, add, delete or reposition at least one field in the second user interface via a touch-sensitive screen, the second user interface including at least the same fields displayed in the same location as the plurality of fields as the first user interface;
cause display, using one or more processors, of the second user interface, the second user interface includes at least one of a display of an activated portion of the second user interface associated with the user selection of the field from the first user interface and a display overlay to view a list of available fields for adding to the second user interface associated with the user selection of the option to perform the field editing operation;
receive at least one editing command to modify at least one of the fields in the second user interface from the user on the touch-sensitive screen;
implement the at least one editing command in the second user interface;
update the first user interface to reflect the modifications to the at least one field made in the second user; and
cause display, using one or more processors, of the updated first user interface.

18. The apparatus of claim 17, wherein the one or more processors is further configured to:
detect, in the productive mode, the user selection from a field of the plurality of fields, the user selection being on the touch-sensitive screen;
receive, in the personalization mode, a user input indicating a new position of the selected field in the second user interface;
identify, in the personalization mode, other fields in the second user interface affected by the new position of the selected field; and
reposition, in the personalization mode, the other fields in the second user interface based on the new position of the selected field.

* * * * *